UNITED STATES PATENT OFFICE.

ZENBEI MIWA AND KAMETARO KAWAI, OF TACHIBANA-CHO, NIHONBASHIKU, TOKYO, JAPAN.

PROCESS OF MAKING SOLID PREPARATIONS CONTAINING OILS.

1,122,294.      Specification of Letters Patent.      Patented Dec. 29, 1914.

No Drawing.      Application filed June 6, 1912. Serial No. 702,092.

*To all whom it may concern:*

Be it known that we, ZENBEI MIWA and KAMETARO KAWAI, both subjects of the Emperor of Japan, residing at Tachibana-cho, Nihonbashiku, Tokyo, Japan, have invented certain new and useful Improvements in Processes of Making Solid Preparations Containing Oils, of which the following is a specification.

The present invention consists in mixing a fatty oil, especially cod-liver oil with gelatin, agar agar, maltose or fondant (soft candy) in solution, pouring the mixture in molds and allowing it to solidify to small balls, and smearing the mixed solution consisting of gelatin, agar agar, glycerin and refined sugar or similar substances upon each ball, which is thus invested with a preserving coating.

The object of the invention is to form a fatty oil in a small solidified ball by means of the disposition of the various constituents, to make the percentage of the fat in each ball fixed, and also to prevent it being putrefied or decomposed by the action of air and bacilli, and further to impart sweet taste to the ball.

Any fatty oil makes a perfect emulsion with the other constituents, if the process herein described is followed, and the result obtained in each case is almost the same as that when other oils are used. But as this process is primarily intended for cod-liver oil, it will be described with special reference to this particular oil.

The progress of work in this process may conveniently be subdivided into two stages, that is, first preparing, by utilizing the coagulative quality of gelatin and agar agar and by mixing other required substances, solidified small balls of cod-liver oil, which balls are made to contain a certain fixed quantity of the oil; second, applying a preservative coating to the balls thus prepared.

Fondant (soft candy) or malt extract and water is mixed with a thick boiling solution of gelatin and agar agar, and the mixture is heated in a suitable vessel, and while being strongly stirred cod-liver oil is added, to make a complete emulsion. The thick solution is poured into molds made of starch, the molds being of simple design, *i. e.* the starch powder is put in a wide shallow box, the surface is then leveled and small holes are dug in it. The thick solution poured in the molds easily solidifies when left to cool, forming small roundish masses. The balls are soft and elastic, do not admit of being pulverized, but stand heat and do not collapse in shape.

The constituents in the mixture may be varied more or less according to circumstances, but their relative proportions are generally as follows:—

1. Fondant (soft candy) or malt extract _____ 270.0 parts.
2. Gelatin _____ 15.0 "
3. Agar agar _____ 2.0 "
4. Water _____ 85.0 "
5. Cod-liver oil _____ 240.0 "

In preparing the balls of cod-liver oil in the described manner, the emulsion, *i. e.* combination of the constituents, is complete, and there is least danger of the oil becoming separated. The balls are easily digestible, nutritious, palatable, and also odoriferous. Each ball contains a certain fixed quantity of cod-liver oil, and therefore, there is no trouble in determining the quantity of the oil each time the balls are taken.

In the practical working of the present process, fondant (soft candy), malt extract or refined sugar may be substituted by other saccharine matters or dextrin, while fish-gelatin in place of ordinary gelatin may be used, according to circumstances. The relative proportions of the constituents used may be modified, within the limit of not materially changing the spirit of the present invention.

Having now particularly described and ascertained the nature of our said invention and in what manner the same is to be performed, we declare that what we claim is:—

A process of making solid preparations containing oils, which consists in making a mixture of fondant in water and adding this mixture to a heated solution of gelatin and agar agar and adding to the mixture a fatty oil while stirring and solidifying the product.

ZENBEI MIWA.
KAMETARO KAWAI.

Witnesses:
  Y. FUKUKITA,
  M. NAMBU.